US 011414834 B2

United States Patent
Saiki

(10) Patent No.: US 11,414,834 B2
(45) Date of Patent: Aug. 16, 2022

(54) TRAVEL ROUTE GUIDANCE DEVICE

(71) Applicant: KOBELCO CONSTRUCTION MACHINERY CO., LTD., Hiroshima (JP)

(72) Inventor: Seiji Saiki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 160 days.

(21) Appl. No.: 16/753,629

(22) PCT Filed: Oct. 12, 2018

(86) PCT No.: PCT/JP2018/038091
§ 371 (c)(1),
(2) Date: Apr. 3, 2020

(87) PCT Pub. No.: WO2019/082692
PCT Pub. Date: May 2, 2019

(65) Prior Publication Data
US 2020/0240111 A1 Jul. 30, 2020

(30) Foreign Application Priority Data
Oct. 27, 2017 (JP) .............................. JP2017-208256

(51) Int. Cl.
*E02F 9/20* (2006.01)
*G01C 21/34* (2006.01)
*G05D 1/02* (2020.01)

(52) U.S. Cl.
CPC ............ *E02F 9/2045* (2013.01); *E02F 9/205* (2013.01); *G01C 21/3469* (2013.01);
(Continued)

(58) Field of Classification Search
CPC ......... E02F 3/841; E02F 9/2045; E02F 9/205; G05D 1/0217; G05D 1/0274;
(Continued)

(56) References Cited

U.S. PATENT DOCUMENTS

| 7,463,953 | B1 * | 12/2008 | Lee ......................... G01C 9/08 701/1 |
| 7,894,957 | B2 * | 2/2011 | Carlson .................. B60T 11/21 701/33.9 |

(Continued)

FOREIGN PATENT DOCUMENTS

| CN | 104303123 A | * | 1/2015 | ........... A01B 69/008 |
| CN | 108394404 A | * | 8/2018 | |

(Continued)

OTHER PUBLICATIONS

International Search Report dated Jan. 15, 2019 in PCT/JP2018/038091 filed on Oct. 12, 2018, 2 pages.

*Primary Examiner* — Angelina Shudy
(74) *Attorney, Agent, or Firm* — Oblon, McClelland, Maier & Neustadt, L.L.P.

(57) ABSTRACT

When deriving a preparation-unrequired route which enables a construction machine to travel only within a permissible range of a gradient until reaching a destination, a controller causes an output part to output information about the preparation-unrequired route. When not deriving the preparation-unrequired route, the controller determines a location which needs preparation for a specific landform to enable the construction machine to travel only within the permissible range of the gradient until reaching the destination, and causes the output part to output information about the location which needs the preparation and about the traveling route.

6 Claims, 6 Drawing Sheets

(52) U.S. Cl.
CPC ......... *G05D 1/0217* (2013.01); *G05D 1/0274* (2013.01); *G05D 2201/0202* (2013.01)

(58) Field of Classification Search
CPC ......... G05D 2201/0202; G05D 1/0214; G01C 21/3469; G01C 21/005; G01C 21/34; G01C 21/3461; A01B 69/00; B62D 15/025; B62D 15/029
See application file for complete search history.

(56) References Cited

U.S. PATENT DOCUMENTS

| | | | | |
|---|---|---|---|---|
| 8,577,558 | B2* | 11/2013 | Mitchell | G05D 1/021 |
| | | | | 701/41 |
| 9,481,977 | B1* | 11/2016 | Clar | E02F 9/2045 |
| 9,616,923 | B2 | 4/2017 | Lavoie | B60W 10/18 |
| 10,464,545 | B2* | 11/2019 | Marutani | B60W 30/18027 |
| 10,474,153 | B2* | 11/2019 | Matsuzaki | B62D 15/029 |
| 10,860,016 | B1* | 12/2020 | Wang | E02F 9/262 |
| 2008/0004790 | A1* | 1/2008 | Ames | G08G 1/205 |
| | | | | 701/532 |
| 2010/0076640 | A1 | 3/2010 | Maekawa et al. | |
| 2010/0250056 | A1* | 9/2010 | Perkins | B60T 8/175 |
| | | | | 701/90 |
| 2012/0004816 | A1* | 1/2012 | Okamura | F02D 29/04 |
| | | | | 701/50 |
| 2012/0323454 | A1* | 12/2012 | Clifford | A01D 75/28 |
| | | | | 701/50 |
| 2013/0013204 | A1 | 1/2013 | Kazama et al. | |
| 2014/0324291 | A1* | 10/2014 | Jones | G05D 1/0278 |
| | | | | 701/41 |
| 2015/0151756 | A1* | 6/2015 | Han | B60W 30/18145 |
| | | | | 701/93 |
| 2015/0292892 | A1 | 10/2015 | Claes | |
| 2016/0068166 | A1* | 3/2016 | Chen | B60W 40/06 |
| | | | | 701/32.9 |
| 2016/0170411 | A1* | 6/2016 | Wei | G05D 1/0214 |
| | | | | 701/25 |
| 2017/0015265 | A1* | 1/2017 | Watanabe | B60R 21/0132 |
| 2017/0318732 | A1 | 11/2017 | Yamashita et al. | |
| 2018/0024563 | A1* | 1/2018 | Matsuzaki | B62D 15/025 |
| | | | | 701/41 |
| 2018/0045525 | A1* | 2/2018 | Ara | G01C 21/3469 |
| 2018/0136005 | A1* | 5/2018 | Forutanpour | G01C 21/3602 |
| 2018/0274206 | A1* | 9/2018 | Kozui | E02F 9/262 |
| 2018/0281794 | A1* | 10/2018 | Ravichandran | B60K 37/06 |
| 2020/0048869 | A1* | 2/2020 | Christofferson | E02F 3/844 |
| 2020/0048870 | A1* | 2/2020 | Peat | E02F 3/7677 |
| 2020/0089230 | A1* | 3/2020 | Oetken | G05D 1/0219 |
| 2020/0369320 | A1* | 11/2020 | Niewiadomski | B60W 10/20 |
| 2021/0094535 | A1* | 4/2021 | Thompson | G01C 21/005 |
| 2021/0123212 | A1* | 4/2021 | Toyama | E02F 9/2228 |
| 2021/0262203 | A1* | 8/2021 | Fujiwara | E02F 9/2285 |
| 2021/0291647 | A1* | 9/2021 | Takase | B60K 28/10 |

FOREIGN PATENT DOCUMENTS

| | | | | |
|---|---|---|---|---|
| JP | | 2009-268270 A | 11/2009 | |
| JP | | 2010-73080 A | 4/2010 | |
| JP | | 2013-19683 A | 1/2013 | |
| JP | | 2016-95813 A | 5/2016 | |
| WO | WO-2019207993 A1 * | | 10/2019 | ............. E02F 9/123 |

* cited by examiner

TRAVEL ROUTE GUIDANCE DEVICE

TECHNICAL FIELD

The present invention relates to a traveling route guidance device which performs a guide of a traveling route for a construction machine.

BACKGROUND ART

Technologies of deriving a specific traveling route in consideration of a slope in a landform around a vehicle have been recently developed. For example, Patent Literature discloses the below-described technology of preventing a vehicle from failing to climb a slope having a steep gradient when an electrically driven motor can output only a decreased torque due to a breakage or abnormality occurring in a motor controller during driving of the electrically driven motor in a weak magnetic field state. In other words, Patent Literature 1 discloses deriving from map data a specific route from a current position of the vehicle to a destination, the route excluding any slope having a predetermined gradient ratio or higher (claim 5).

The aforementioned technology, however, has a problem that no traveling route is derived in a case that the vehicle cannot reach the destination without passing through a route including a slope having such a predetermined gradient ratio or higher.

CITATION LIST

Patent Literature

Patent Literature 1: Japanese Unexamined Patent Publication No. 2009-268270

SUMMARY OF INVENTION

The present invention has an object to provide a traveling route guidance device which can perform a guide for enabling a construction machine to easily reach a destination even in a case of having to travel in an impermissible range of a gradient.

A traveling route guidance device according to an aspect of the present invention includes: a landform acquiring part which acquires three-dimensional landform information about a landform around a construction machine; a current position acquiring part which acquires a current position of the construction machine with respect to the three-dimensional landform information; a destination acquiring part which acquires a destination with respect to the three-dimensional landform information; a controller which derives at least one traveling route from the current position to the destination for the construction machine based on the three-dimensional landform information; an output part which outputs information about a traveling route derived by the controller; and a memory which stores permissible range information representing a permissible range of a gradient determined in terms of a stability of the construction machine in advance, wherein when deriving a preparation-unrequired route which is a traveling route which enables the construction machine to travel thereon only within the permissible range of the gradient until reaching the destination, the controller causes the output part to output information about the preparation-unrequired route, and when not deriving the preparation-unrequired route, the controller determines a location which needs a preparation for a specified landform to enable the construction machine to travel only within the permissible range of the gradient until reaching the destination, and causes the output part to output information about the location which needs the preparation and about the traveling route.

This configuration makes it possible to perform a guide for enabling a construction machine to easily reach a destination even in the case of having to travel in an impermissible range of a gradient.

DESCRIPTION OF EMBODIMENTS

A construction machine 10 and a traveling route guidance device 20 will be described with reference to FIGS. 1 to 6.

Figure 3:
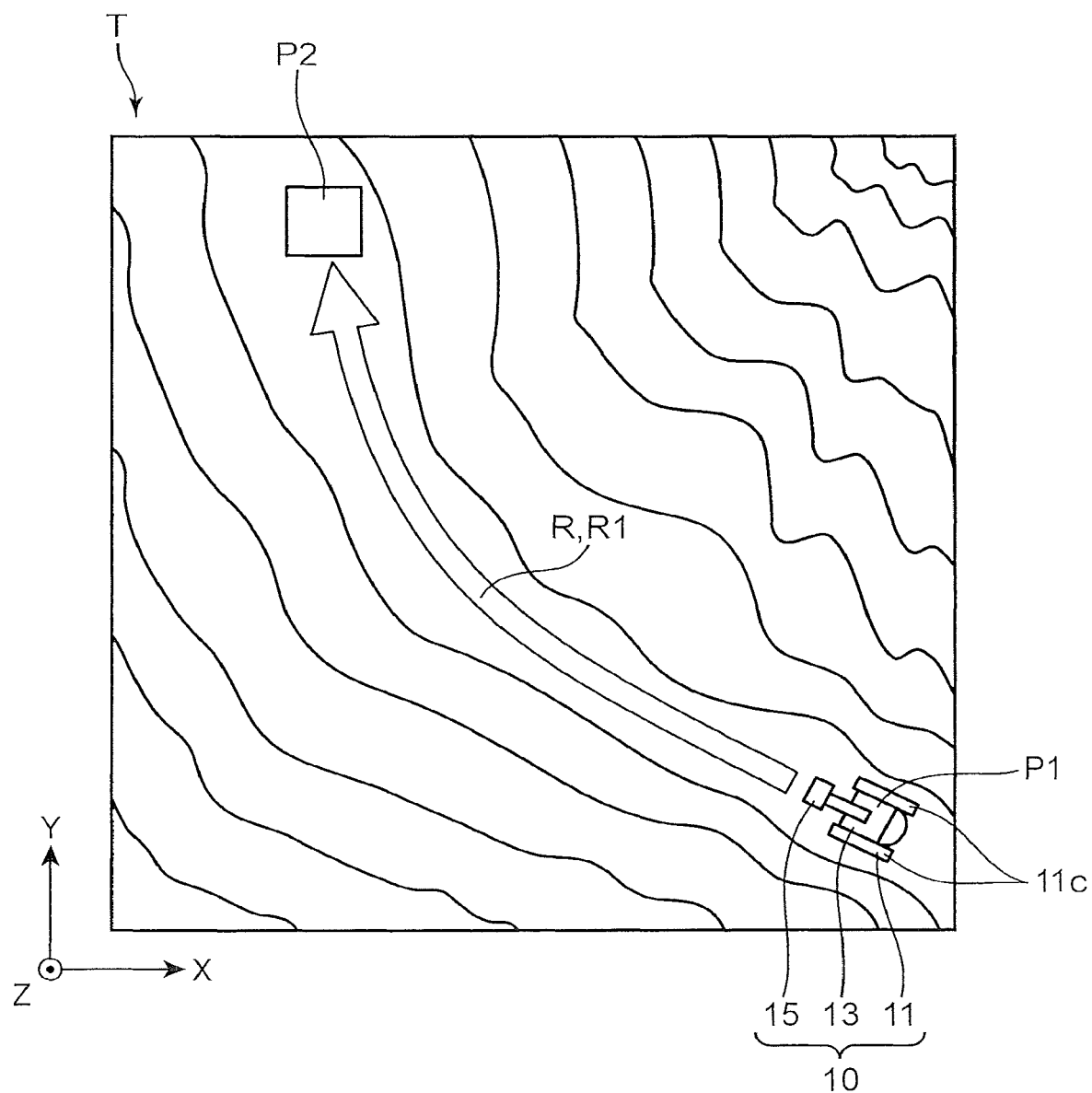
FIG. 3 shows an exemplary preparation-unrequired route R1 derived by a controller 40 shown in FIG. 1.

As shown in FIG. 3, the construction machine 10 is a machine, e.g., an excavator, which performs an operation of a construction work or the like and is adapted for a preparation of a landform. For traveling, the construction machine 10 may be operated in an operating room thereof, externally and remotely operated, or automatically controlled. Each operational way is applicable to other operations as well as the traveling operation. The construction machine 10 includes a lower traveling body 11, an upper slewing body 13, and an attachment 15. The lower traveling body 11 has right and left crawlers 11c for enabling the construction machine 10 to travel forward and backward. For example, the upper slewing body 13 is slewable in the direction of yawing with respect to the lower traveling body 11 owing to a driving force from an electrically driven motor or a hydraulic motor. The attachment 15 includes a boom rotatably attached to the upper slewing body 13, an arm swingably attached to the boom, and a bucket rotatably attached to the arm, and performs the preparation of the landform. Each of the arm, the boom, and the bucket is swung or rotated by an actuator such as a hydraulic cylinder. The attachment 15 has a configuration in which the bucket is replaceable with other working component such as a breaker or a nibbler.

With reference to FIG. 1 again, the traveling route guidance device 20 performs a guide (support and assistance) of a traveling route R for the construction machine 10 in consideration of a slope in a landform around the construction machine 10. The traveling route guidance device 20 may be provided on the construction machine 10, an outside of the construction machine 10, or both the construction machine 10 and the outside thereof.

In the case that the traveling route guidance device 20 is provided on the outside of the construction machine 10, the traveling route guidance device 20 is, for example, mounted to a server communicatively connected with the construction machine 10. In the case that the traveling route guidance device 20 is provided on both the construction machine 10 and the outside of the construction machine 10, a part of the structural components of the traveling route guidance device 20 is, for example, mounted to the construction machine 10, and the remaining structural components are mounted to the server.

Figure 1:
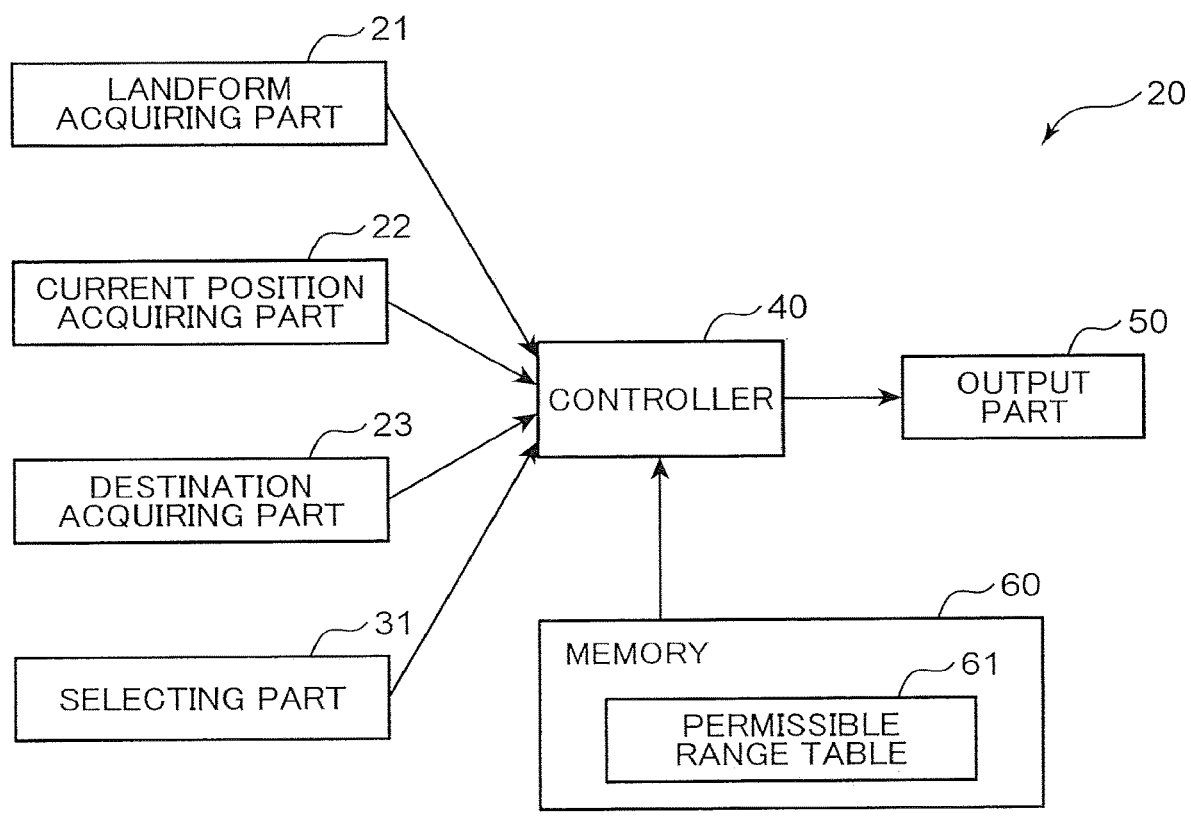
FIG. 1 is a block diagram showing a configuration of a traveling route guidance device 20.

As shown in FIG. 1, the traveling route guidance device 20 includes a landform acquiring part 21, a current position acquiring part 22, a selecting part 31, a controller 40, an output part 50, and a memory 60.

As shown in FIG. 3, the landform acquiring part 21 acquires three-dimensional landform information T about the landform around the construction machine 10. The three-dimensional landform information T includes positional data respectively representing a plurality of positions in a three-dimensional coordinate space defined by an X-axis extending in a horizontal direction, a Y-axis extending in a vertical direction, and a Z-axis extending in a height direction perpendicularly intersecting the X and Y-axes. A positional datum consists of three components X, Y, and Z. Among the three components, for instance, the component X indicates a latitude, the component Y indicates a longitude, and the component Z indicates an elevation. Hence, a degree of a gradient in a certain direction at each of the positions of the three-dimensional landform information T enables to be computed using the positional data included in the three-dimensional land form information T.

With reference to FIG. 1 again, the landform acquiring part 21 is made up of, for example, a distance image sensor mounted on the construction machine 10. The distance image sensor may measure a three-dimensional form by a TOF (Time-of-Flight) way or a stereo camera.

Besides, the landform acquiring part 21 may obtain the three-dimensional landform information by taking an image from the sky. In this case, the landform acquiring part 21 can be mounted to a flying object, e.g., a drone, which is communicative with the construction machine 10. The memory 60 may store the three-dimensional landform information T in advance. This configuration allows the landform acquiring part 21 to acquire the three-dimensional landform information T from the memory 60. In the examples shown in FIGS. 3 to 6, the landform of the three-dimensional landform information T is represented by contours.

The current position acquiring part 22 acquires a current position P1 of the construction machine 10 with respect to the three-dimensional landform information T. The current position acquiring part 22 is made up of, for instance, a GPS sensor which acquires the current position P1 by using a satellite positioning system. However, the sensor is a mere example. The current position acquiring part 22 may acquire the current position P1 by taking an image from the sky. In this case, the current position acquiring part 22 is made up of a distance image sensor and a GPS sensor mounted on the flying object. Furthermore, it is sufficient in this case that the current position acquiring part 22 calculates a relative position of the construction machine 10 to the flying object from a measured value of the distance image sensor, and calculates the position of the construction machine 10 by using a self-position and the relative position obtained from the GPS sensor.

Alternatively, the current position acquiring part 22 may be made up of an input device, e.g., a switch, a touch panel, and a keyboard, and acquires the current position P1 in response to an operation of a user of the traveling route guidance device 20 (hereinafter, simply referred to as a "user"). In this case, it is sufficient that the current position acquiring part 22 acquires the current position P1 by permitting the user to input the coordinate of the current position P1. Moreover, in this case, the current position acquiring part 22 may acquire the current position P1 by permitting the user to designate a position on a map displayed on a display device.

The destination acquiring part 23 acquires a destination P2 of the construction machine 10 with respect to the three-dimensional landform information T. The destination acquiring part 23 is made up of an input device, e.g., a switch, a touch panel, and a keyboard, and acquires the destination P2 in response to an operation of the user. It is sufficient in this case that the destination acquiring part 23 acquires the destination P2 by permitting the user to input the coordinate of the destination P2. Moreover, in this case, the destination acquiring part 23 acquires the current position P1 by permitting the user to designate a position on a map displayed on a display device. Further, the destination acquiring part 23 may acquire the destination P2 from the memory which stores the destination P2 in advance. In the case that the construction machine 10 is remotely operated or automatically controlled, the destination acquiring part 23 may acquire the destination P2 by using a communication device to receive the destination externally transmitted via a transmission channel.

Figure 6:
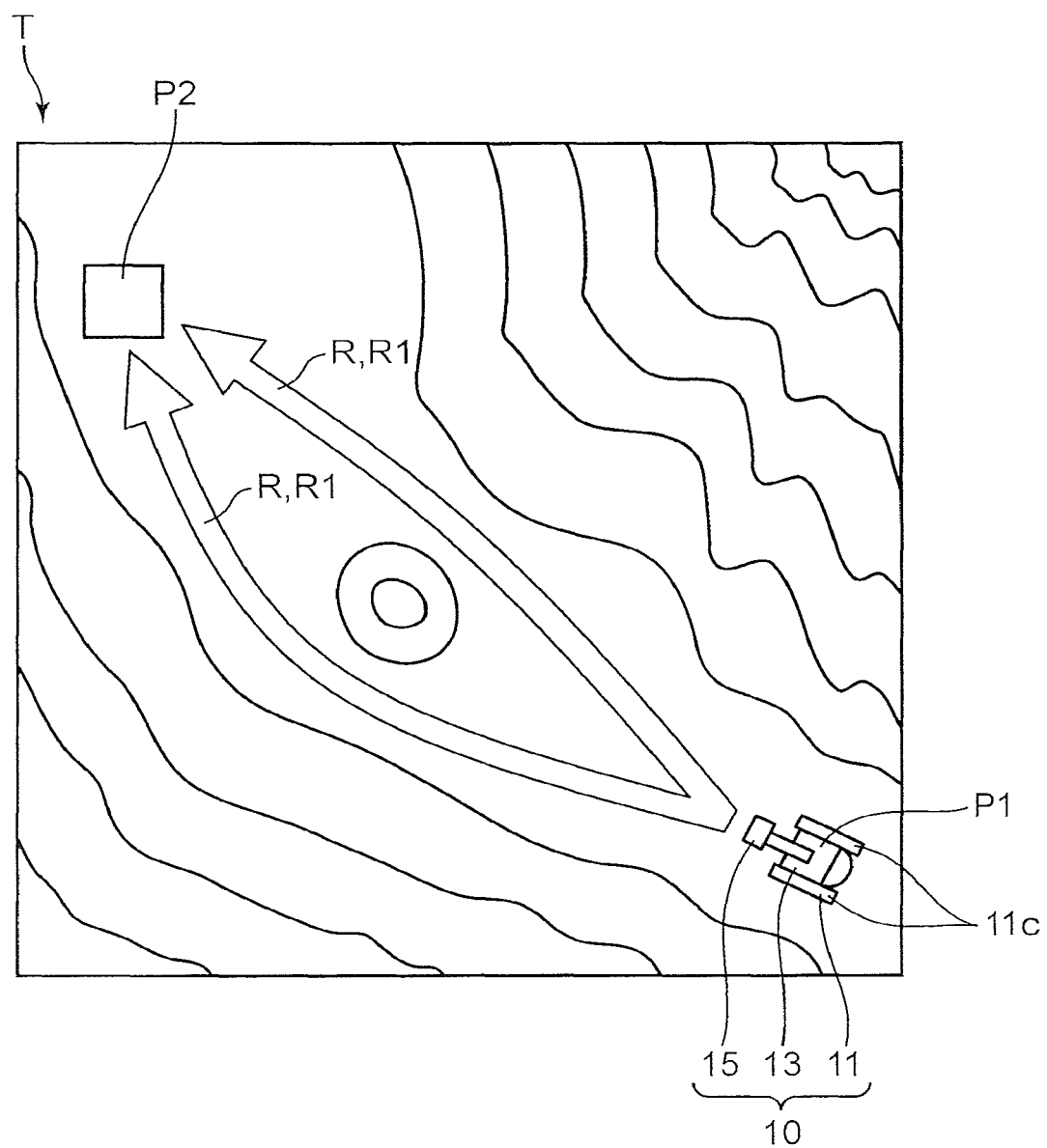
FIG. 6 shows exemplary preparation-unrequired routes R1 derived by the controller 40 shown in FIG. 1.

The selecting part 31 (see FIG. 1) is made up of, for example, an input device and a display device, and permits the user to select a specific traveling route R from a plurality of candidate traveling routes R shown in FIG. 6. For example, the selecting part 31 may permit the user to use an input device, e.g., a switch, thereby selecting the specific traveling route R from the plurality of candidate traveling routes R displayed on the display device.

The controller 40 is made up of a computer including a processor, such as a CPU, and a ROM, and performs calculations including: an input and an output of information; storing of the information; and deriving of a traveling route R. The deriving of the traveling route R will be described in detail later.

The output part 50 is made up of, for example, a display device and a speaker, and outputs information about the traveling route R. For example, the information about the traveling route R includes an image and a voice adoptable for guiding the construction machine 10 on the traveling route R from the current position P1 to the destination P2.

The memory 60 is, for example, a non-volatile memory, and stores a permissible range table 61.

Operation

Figure 2:
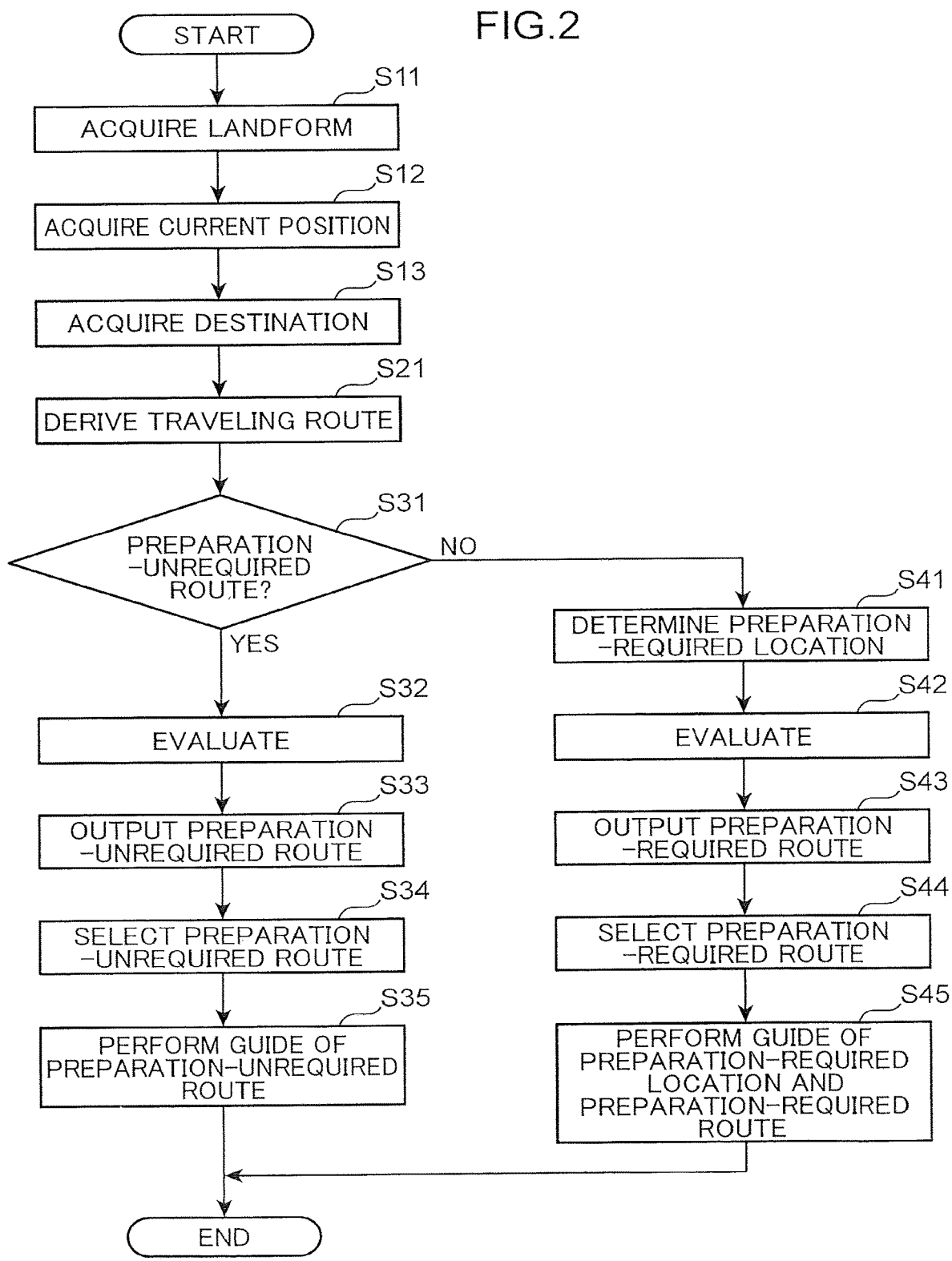
FIG. 2 is a flowchart executed by the traveling route guidance device 20 shown in FIG. 1.

The operation executed by the traveling route guidance device 20 shown in FIG. 1 will be described with reference to the flowchart shown in FIG. 2. Hereinafter, the aforementioned structural components of the traveling route guidance device 20 will be described with mainly reference to FIG. 1, and respective steps in the flowchart will be described with reference to FIG. 2.

First, the landform acquiring part 21 acquires the three-dimensional landform information T about the landform around the construction machine 10 shown in FIG. 3 (Step S11), and inputs the acquired information in the controller 40. Next, the current position acquiring part 22 acquires the current position P1 of the construction machine 10 (Step S12), and inputs the acquired current position in the controller 40. Subsequently, the destination acquiring part 23 acquires the destination P2 (Step S13), and inputs the acquired destination in the controller 40. Thereafter, the controller 40 derives a traveling route R from the current position P1 to the destination P2 for the construction machine 10 based on the three-dimensional landform information T (Step S21).

Deriving of Traveling Route

In Step S21, the controller 40 may derive, for instance, one or more traveling routes R by executing the processings described below. First, the controller 40 divides the three-dimensional landform information T into a plurality of blocks by partitioning the three-dimensional landform information T into grids on an X-Y plane. Each of the blocks may be in a square or rectangular shape having a predetermined size.

Next, the controller 40 defines respective centers of the blocks as nodes, and sets a graph in which the centers are linearly linked with each other. In this case, the distance between the linked centers is exemplified by a distance between the nodes.

Furthermore, the controller 40 derives one or more traveling routes R from the current position P1 to the destination P2 by applying various route deriving algorisms to the three-dimensional landform information T. The route deriving algorisms include depth-priority deriving, width-priority deriving, uniform-cost deriving, A-star algorithm, Dijkstra's algorithm, and random deriving. In this manner, a plurality of traveling routes R are obtainable.

Permissible Range of Gradient

The controller 40 detects from the traveling routes R derived in Step S21 a preparation-unrequired route R1 which achieves traveling from the current position P1 only within a permissible range of a gradient until reaching the destination P2. The controller 40 detects a preparation-unrequired route R1 by comparing a degree of a gradient with a predetermined permissible range. The degree of the gradient can be defined by, for example, a gradient ratio or an angle with respect to a horizontal plane. The permissible range of the gradient is determined in terms of the stability of the construction machine 10. Such a gentle gradient as to permit the construction machine 10 to stably travel is determined to fall within the permissible range. Conversely, such a steep gradient as to hinder the construction machine 10 from traveling is determined to deviate from the permissible range.

Figure 4:
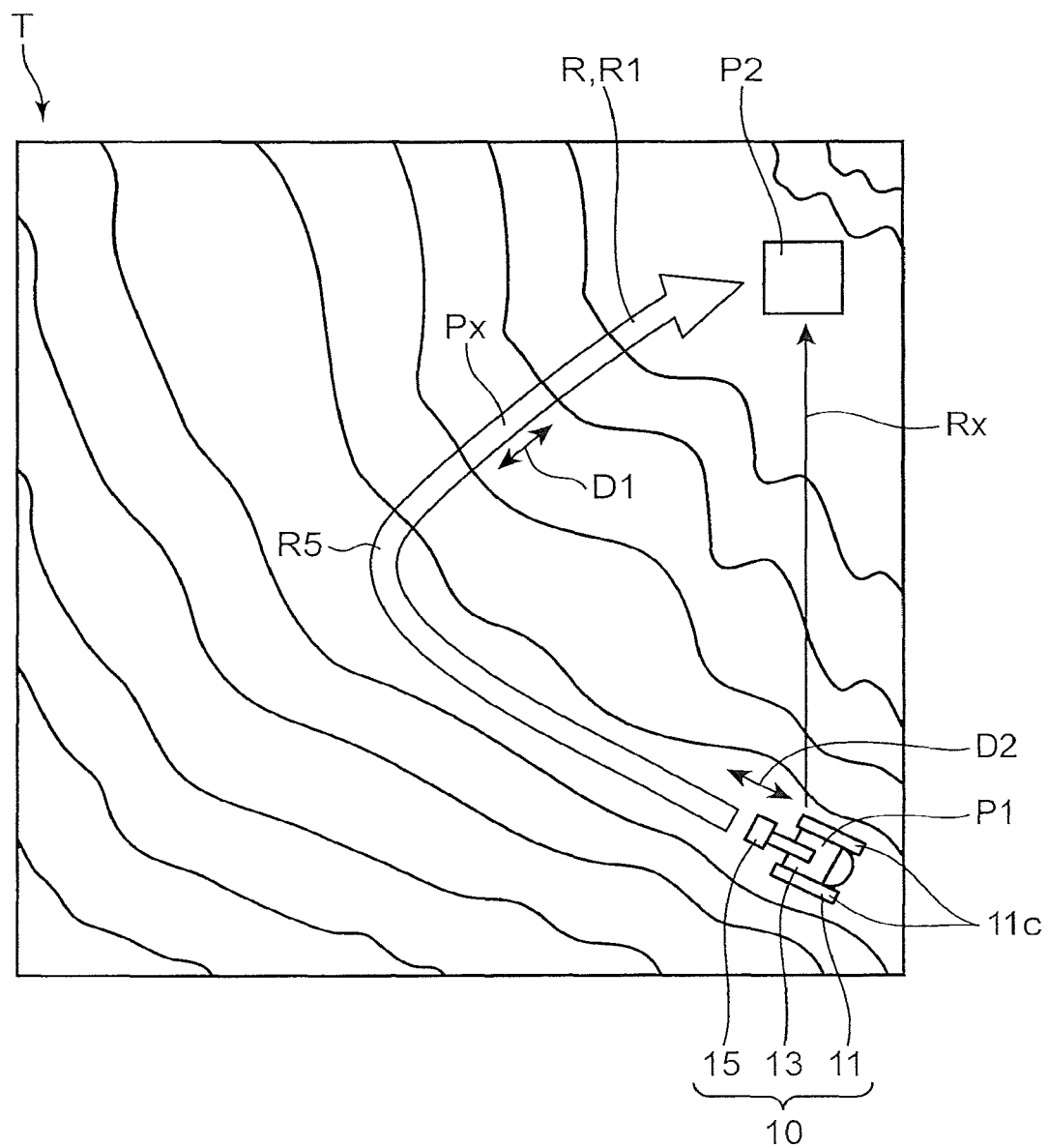
FIG. 4 shows another exemplary preparation-unrequired route R1 derived by the controller 40 shown in FIG. 1.

FIG. 4 shows a gradient direction D1 that indicates a direction in which the degree of the gradient reaches maximum, that is, a height direction in which an amount of change reaches the maximum. FIG. 4 exemplifies the gradient direction D1 at a specific location Px. Moreover, shown is an advancing direction D2 of the crawler 11c indicating a direction in which the right and left crawlers 11c extend, that is, a direction (i.e., front-rear direction) in which the lower traveling body 11 advances.

The stability of the construction machine 10 depends on the advancing direction D2 of the crawler 11c with respect to the gradient direction D1. Specifically, the stability of the construction machine 10 increases as the angle between the gradient direction D1 and the advancing direction D2 of the crawler 11c decreases even at the same degree of the gradient. For example, the landform shown in FIG. 4 includes a traveling route Rx linearly running from the current position P1 to the destination P2. The traveling route Rx is highly likely to hinder the construction machine 10 from reaching the destination P2 in a stable state. This is because the traveling route Rx involves a large angle between the gradient direction D1 and the advancing direction D2 of the crawler 11c, and consequently, the degree of the gradient is highly likely to exceed the permissible range at a specific location.

In contrast, a traveling route, like a traveling route R5, passing through a relay location P5 to reach a destination P2 and causing the construction machine 10 to travel a slope in an ascending or descending direction of the slope involves an angle of approximately 0° between the gradient direction D1 and the advancing direction D2 of the crawler 11c at the location where the gradient direction D1 and the advancing direction D2 of the crawler 11c are substantially the same. Therefore, the traveling route R5 has an increased possibility that the degree of the gradient at the location falls within the permissible range, and consequently permits the construction machine 10 to reach the destination P2 in a stable state.

From these perspectives, the permissible range of the gradient is set depending on the advancing direction D2 of the crawler 11c with respect to the gradient direction D1. For instance, the permissible range of the gradient is set at the maximum for the angle of 0° between the gradient direction D1 and the advancing direction D2 of the crawler 11c. This setting can increase the possibility that even a location having a steep degree of a gradient is determined to fall within the permissible range of the gradient under the condition that the angle between the gradient direction D1 and the advancing direction D2 of crawler 11c is 0°.

The permissible range of the gradient is gradually or continuously decreased as the angle between the gradient direction D1 and the advancing direction D2 of the crawler 11c increases. The permissible range of the gradient is set at the minimum for the angle of 90° between the gradient direction D1 and the advancing direction D2 of the crawler 11c.

The permissible range table 61 (serving as exemplary permissible range information) stored in the memory 60 results in having a data structure described below. Specifically, the permissible range table 61 is a two-dimensional table, for example, defined by a vertical axis representing a degree of a gradient, and a horizontal axis representing an angle between the gradient direction D1 and the advancing direction D2 of the crawler 11c. The permissible range table 61 has cells each storing a corresponding predetermined permissible range of a gradient. The permissible range of the gradient is set so that an upper limit of the permissible range of the gradient is basically increased as the degree of the gradient increases. Exceptionally, the upper limit of the permissible range is decreased as the angle between the gradient direction D1 and the advancing direction D2 of the crawler 11c increases at the same degree of the gradient. Meanwhile, a lower limit of the permissible range of the gradient may be uniformly set at, for example, 0° regardless of any angle between the gradient direction D1 and the advancing direction D2 of the crawler 11c.

With reference to FIG. 2 again, the controller 40 determines in Step S31 whether the traveling routes R derived in Step S21 include a preparation-unrequired route R1.

Determination of Preparation-Unrequired Route R1

The controller 40 may determine in Step S31 a preparation-unrequired route R1 from among the traveling routes R in a manner described below. The following processings are applied to each of the traveling routes R. First, the controller 40 performs mapping of each of the traveling routes R onto the three-dimensional landform information T divided into the plurality of blocks, and specifies one or more blocks constituting the traveling route R. Next, the controller 40 calculates a degree of a gradient in each of the specified blocks with respect to a direction of the traveling route R, i.e., the advancing direction D2 of the crawler C1

Subsequently, the controller 40 obtains the gradient direction D1 for each of the blocks constituting the traveling route R by using the three-dimensional landform information T. Further, the controller 40 calculates for each of the blocks constituting the traveling route R an angle between the gradient direction D1 and the advancing direction D2 of the crawler C1. With reference to the permissible range table 61, the controller 40 then determines, for each of the blocks constituting the traveling route R, a permissible range associated with the angle between the gradient direction D1 and the advancing direction D2 of the crawler C1, and with the degree of the gradient with respect to the advancing direction D2 of the crawler C1. Moreover, the controller 40 determines for each of the blocks constituting the traveling route R whether the degree of the gradient in the advancing direction D2 of the crawler C1 falls within the permissible range. When a specific block has a gradient of a slope which is not higher than the upper limit of the permissible range with respect to the advancing direction D2 of the crawler C1, the controller 40 may determine that the degree of the gradient in the specific block falls within the permissible range. To the contrary, when the specific block has a gradient of a slope which is higher than the upper limit of the permissible range, the controller 40 may determine that the degree of the gradient in the specific block deviates from the permissible range.

Finally, the controller 40 determines the traveling route R as a preparation-unrequired route R1 when the degree of the gradient in each of all the blocks constituting the traveling route R is found to fall within the permissible range. Conversely, the controller 40 determines the traveling route R as a preparation-required route R2 when at least one of the blocks constituting the traveling route R is found to have a gradient deviating from the permissible range.

With reference to FIG. 2 again, the flowchart proceeds to Step S32 when the preparation-unrequired route R1 is derived in Step S31 (i.e., "Yes" in Step S31). In a case of deriving a plurality of preparation-unrequired routes R1, the controller 40 executes in Step S32 processings of evaluating each of the plurality of preparation-unrequired routes R1 to determine a specific one or more preparation-unrequired routes R1 to be output by the output part 50. Hereinafter, the processings of evaluating the preparation-unrequired route R1 will be described. It should be noted here that the evaluation processings are applicable to the preparation-required route R2 in the same manner. Accordingly, the below-described evaluation processings can cover both the preparation-unrequired route and the preparation-required route.

Evaluation of Traveling Route R

In a situation of a plurality of traveling routes R (preparation-unrequired routes R1 or preparation-required routes R2), like the traveling one shown in FIG. 3, from a current position P1 to a destination P2, the controller 40 evaluates each of the traveling routes R based on predetermined evaluation criteria, and determines a specific traveling route R to be output by the output part 50 based on the evaluation. Exemplary evaluation criteria will be described below. However, the number, the contents, the weight and the like of the evaluation criteria may be set in various ways.

First Exemplary Evaluation Condition

A first exemplary evaluation condition evaluation value $\alpha$ of a traveling route R to be an evaluation target (hereinafter, referred to as a "target traveling route") is higher as a traveling distance from the current position P1 to the destination P2 is shorter.

The controller 40 may calculate a three-dimensional route distance of the target traveling route by using the three-dimensional landform information T, and increase the evaluation value $\alpha$ as the three-dimensional route distance is shorter. For example, a reciprocal of the route distance of the target traveling route may serve as the evaluation value $\alpha$.

Second Exemplary Evaluation Condition

A second exemplary evaluation condition is that an evaluation value $\beta$ of the target traveling route is higher as the route has a gentler gradient. In this configuration, it is sufficient that the controller 40 calculates an allowance of the degree of the gradient with respect to the permissible range in each of the brocks constituting the target traveling route, and further calculates the sum of the calculated allowances as the evaluation value $\beta$ with respect to the target traveling route. Here, a difference obtained by subtracting the degree of the gradient from the permissible range is adopted as the allowance. In this configuration, the allowance reaches a minus value when the degree of the gradient exceeds the permissible range. As a result, the target traveling route which includes locations each having such a gradient exceeding the permissible range has a lowered evaluation value $\beta$.

The controller 40 may specify a block having the maximal degree of the gradient on the target traveling route, and calculate the allowance in the specified block as the evaluation value $\beta$ of the target traveling route.

Third Exemplary Evaluation Condition

A third exemplary evaluation condition is that an evaluation value $\gamma$ of the target traveling route is higher as a necessary fuel required to allow the construction machine 10 to travel from the current position P1 until reaching the destination P2 is less. The controller 40 calculates an altitude difference between the current position P1 and the destination P2, and a route distance from the current position P1 to the destination P2 by using the three-dimensional landform information T, and obtains the traveling fuel required to allow the construction machine 10 to travel from the current position P1 to the destination P2 based on the altitude difference and the route distance. Further, the controller 40 may set a reciprocal of the obtained necessary fuel as the evaluation value $\gamma$.

The traveling fuel required for the traveling from the current position P1 to the destination P2 increases as the altitude difference between the current position P1 and the destination P2 increases and the route distance from the current position P1 to the destination P2 increases. Under the circumstances, the memory 60 in the embodiment stores a fuel calculation table showing a relationship that the traveling fuel increases in accordance with the increases in the altitude difference and the route distance of the target traveling route. Moreover, the controller 40 may calculate the traveling fuel by determining the traveling fuel corresponding to the altitude difference and the route distance on the target traveling route with reference to the fuel calculation table.

Furthermore, the preparation-required route R2 requires a preparation for a landform at a location having a degree of a gradient deviating from a permissible range. Thus, the controller 40 may calculate a preparation fuel required for the preparation of the landform on the preparation-required route R2, and calculate a necessary fuel by adding the preparation fuel to the traveling fuel. In this case, the controller 40 may set the preparation fuel at a higher value, for example, as a difference obtained by subtracting the permissible range from the degree of the gradient at a specific location which needs a preparation for a specified landform is larger. Alternatively, the controller 40 may adopt a value predetermined as the preparation fuel.

Also, the controller 40 may calculate a total evaluation value on the target traveling route by performing the following calculation in connection with the evaluation value α, the evaluation value β, and the evaluation value γ:

total evaluation value=$k1$·evaluation value α+$k2$·evaluation value β+$k3$·evaluation value γ.

It should be noted here that the reference signs "k1", "k2" and "k3" are coefficients respectively normalizing the evaluation values α, β, and γ.

In the embodiment, the total evaluation value is calculated by using all the evaluation values α, β, and γ, but may be calculated by using any one or two of the evaluation values α, β, and γ.

With reference to FIG. 2 again, in Step S33, the controller 40 determines one or more preparation-unrequired routes R1 to be output based on the comprehensive evaluation value calculated in Step S32, and causes the output part 50 to output the determined one or more preparation-unrequired routes R1. In this case, the controller 40 may cause the output part 50 to output a preparation-unrequired route R1 having the highest comprehensive evaluation value among the preparation-unrequired routes R1. Here, in a case that two or more of the preparation-unrequired routes R1 have the highest comprehensive evaluation value, the controller 40 may cause the output part 50 to output all these preparation-unrequired routes R1.

Alternatively, when deriving a plurality of preparation-unrequired routes R1 in Step S31, the controller 40 may cause the output part 50 to output the plurality of preparation-unrequired routes R1 in a descending order of the first to the n th ("n" indicates a predetermined integer) comprehensive evaluation values given thereto.

In the case that the output part 50 outputs the plurality of preparation-unrequired routes R1 in Step S33, the selecting part 31 receives in Step S34 an operation of the user to select a specific preparation-unrequired route R1 from the plurality of output preparation-unrequired routes R1. In contrast, in a case that the output part 50 outputs in Step S33 a single preparation-unrequired route R1, the flow proceeds to Step S35 without executing the processing in Step S34.

Subsequently, the controller 40 causes the output part 50 to output information about the preparation-unrequired route R1 and thereby executes a guide of the preparation-unrequired route R1 (Step S35).

Figure 5:
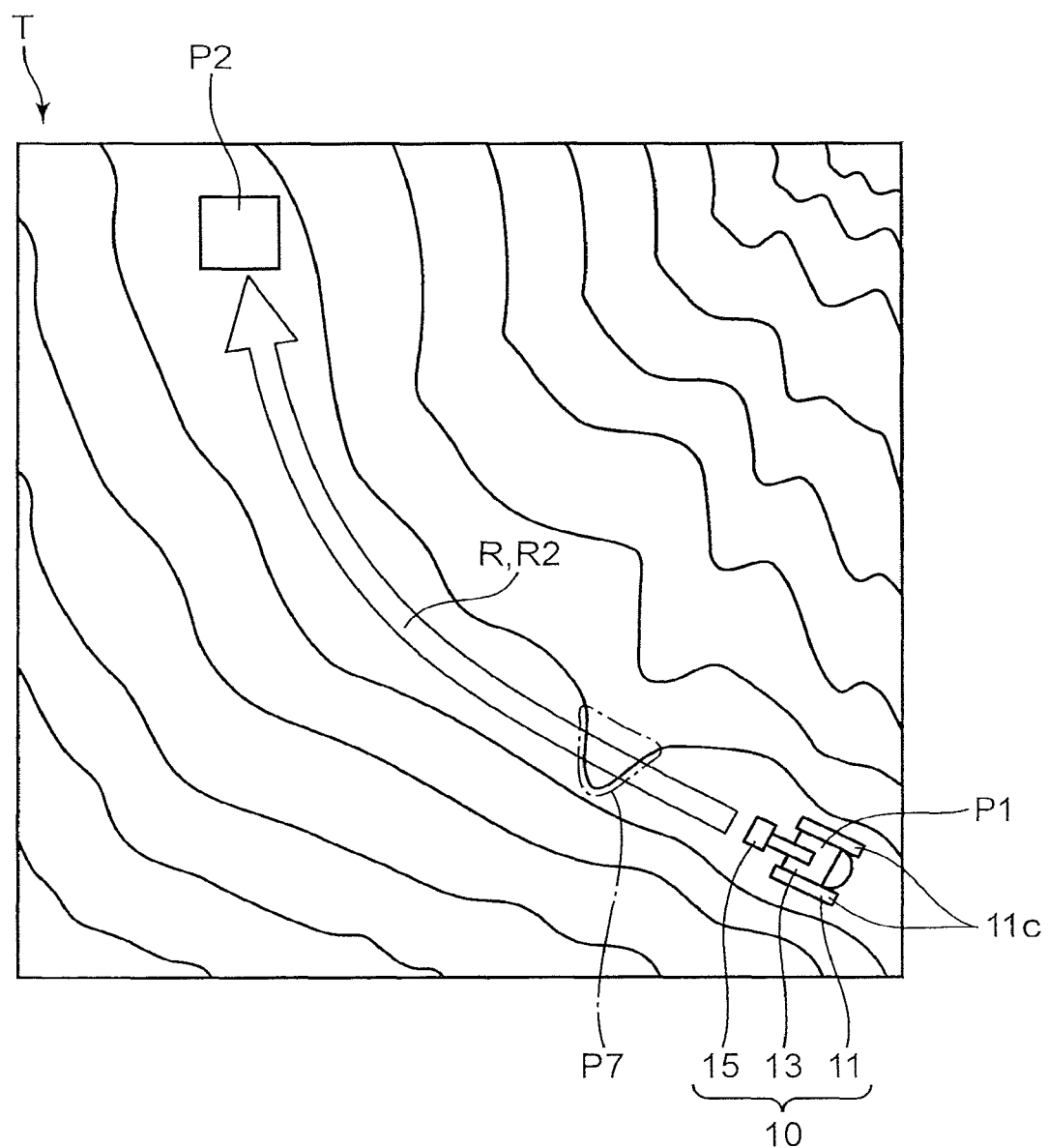
FIG. 5 shows an exemplary preparation-required route R2 derived by the controller 40 shown in FIG. 1.

The information about the preparation-unrequired route R1 may include an image having a two-dimensional map view obtainable from the three-dimensional landform information T for displaying the preparation-unrequired route R1 thereon as shown in FIGS. 4 to 6. Alternatively, the information about the preparation-unrequired route R1 may include a voice adapted for performing a voice guide of the preparation-unrequired route R1 in place of the image. The voice guide may adopt, for example, a voice saying "Change the advancing direction by X degree to the left, and then advance." when the construction machine 10 reaches a location which requires an advancing direction change, or another voice saying "You have reached the destination, and worked well." to achieve the guide for enabling the construction machine 10 to reach the destination P2.

When deriving no preparation-unrequired route R1 ("NO" in Step S31), the controller 40 executes a processing of detecting a location which needs a preparation for a specified landform on each of one or more preparation-required routes R2 (Step S41) to enable the construction machine 10 to travel only within the permissible range of the gradient until reaching the destination P2.

The example shown in FIG. 5 includes such a location detected as a preparation-required location P7 on the preparation-required route R2. It is sufficient here that the controller 40 determines a specific ranged region including a center of a block deviating from the permissible range of the degree of the gradient as the preparation-required location P7. Although the single preparation-required location P7 is detected in the example shown in FIG. 5, the embodiment should not be limited thereto. For instance, in a case that two or more blocks deviating from the permissible range of the degree of the gradient are detected from among the blocks constituting the preparation-required route R2, corresponding two or more preparation-required locations P7 are detected.

Note that the word "preparation" refers to making the gradient gentler so as to fall within the permissible range by way of excavation or land elevation performed by the construction machine 10.

When deriving a plurality of preparation-required routes R2 in Step S31, the controller 40 executes in Step S42 processings of evaluating each of the plurality of preparation-required routes R2. The details of the processings are the same as those executed for the preparation-unrequired routes R1 in Step S32. Exceptionally, the controller 40 may include a reciprocal of the number of the preparation-required locations P7 as an evaluation value σ for determination of a comprehensive evaluation value of the preparation-required route R2. This configuration makes it possible to calculate a higher comprehensive evaluation value for the preparation-required route R2 having a smaller number of the preparation-required locations P7.

The controller 40 determines in Step S43 one or more preparation-required routes R2 to be output based on a result of an ultimate evaluation calculated in Step S42, and causes the output part 50 to output the determined one or more preparation-required routes R2. The processing executed in Step S43 is the same as the processing executed in Step S33 for the preparation-unrequired route R1.

In a case that the output part 50 outputs the plurality of preparation-required routes R2 in Step S43, the selecting part 31 receives in Step S44 an operation of the user to select a specific preparation-required route R2 from the plurality of output preparation-required routes R2.

Subsequently, the controller 40 causes the output part 50 to output information about the specific preparation-required route R2 to be output (Step S45). The information about the preparation-required route R2 includes an image having a map view displaying the preparation-required route R2 and the preparation-required location P7 thereon as shown in FIG. 5, and a voice guide about the preparation-required location P7. The voice guide can adopt, for example, a voice saying "A location which needs a preparation is seen in front." when the construction machine 10 advances into a region at a specific distance from the preparation-required location P7. The voice guide may further adopt a voice saying "Make the slope gentler by way of excavation or land elevation to avoid a decrease in the traveling stability of the construction machine 10 due to traveling without any preparation, and thereafter advance.". In this configuration, the voice may have an upper limit of the permissible range for the preparation-required location P7, the degree of the gradient at the preparation-required location P7, and a difference between the upper limit and the degree of the gradient. In this way, the user can see how much landform needs the preparation. Moreover, the controller 40 may cause the output part 50 to output an image showing the upper limit of the permissible range for the preparation-required location P7, the degree of the gradient at the preparation-required location P7, and the difference between the upper limit and the gradient.

Advantageous Effects

The advantageous effects brought about by the traveling route guidance device 20 shown in FIG. 1 will be described hereafter. The respective structural components of the traveling route guidance device 20 will be described with reference to FIG. 1.

Advantageous Effects of First Invention

A traveling route guidance device 20 includes a landform acquiring part 21, a current position acquiring part 22, a destination acquiring part 23, a controller 40, and an output part 50. As shown in FIG. 3, the landform acquiring part 21 acquires three-dimensional landform information T of a landform around a construction machine 10. The current position acquiring part 22 acquires a current position P1 of the construction machine 10 with respect to the three-dimensional landform information T. The destination acquiring part 23 acquires a destination P2 with respect to the three-dimensional landform information T. The controller 40 derives a traveling route R from the current position P1 to the destination P2 for the construction machine 10. The output part 50 outputs information about the traveling route R derived by the controller 40.

Configuration 1-1

A memory 60 stores a permissible range table 61 showing a permissible range of a gradient determined in terms of the stability of the construction machine 10. When deriving a preparation-unrequired route R1 serving as the traveling route R which need not a preparation and enables the construction machine 10 to travel only within a permissible range of a gradient until reaching the destination P2, the controller 40 causes the output part 50 to output information about the preparation-unrequired route R1.

Configuration 1-2

As shown in FIG. 5, when not deriving the preparation-unrequired route R1, the controller 40 determines a preparation-required route R2 including a preparation-required location P7 to enable the construction machine 10 to travel only within the permissible range of the gradient until reaching the destination P2, and causes the output part 50 to output information about the preparation-unrequired route R1.

As shown in FIG. 3, the traveling route guidance device 20 including the above-described Configuration 1-1 permits the user of the traveling route guidance device 20 to obtain the information about the preparation-unrequired route R1 for achieving the traveling only within the permissible range of the gradient until reaching the destination P2. In this way, the user can grasp no need of a preparation of a landform, and a specific preparation-unrequired route R1 to be adopted for the traveling. Consequently, the traveling route guidance device 20 can perform a guide for enabling the construction machine 10 to easily reach the destination P2 from the current position P1.

As shown in FIG. 5, in a case that the construction machine 10 has to travel in an impermissible range of the gradient to reach the destination P2, the preparation-unrequired route R1 shown in FIG. 3 is not derived. For such a case, the traveling route guidance device 20 includes Configuration 1-2. Owing to this configuration, the user can grasp the preparation-required location P7 and a route to be adopted for the traveling with reference to the information about the preparation-required route R2 even when no preparation-unrequired route R1 is derived. The traveling route guidance device 20 including this configuration can perform a guide for enabling the construction machine 10 to easily reach the destination P2 even in the case of having to travel in the impermissible range of the gradient.

Advantageous Effects of Second Invention

As shown in FIG. 4, the permissible range of the gradient depends on an advancing direction D2 of a crawler 11c of the construction machine 10 with respect to a gradient direction D1 which is a maximizing gradient direction of a slope at a specific location.

Generally, the stability of the construction machine 10 depends on the advancing direction D2 of the crawler 11c with respect to the gradient direction D1. Hence, in a case that the permissible range is set in consideration of only the degree of the gradient regardless of the angle between the gradient direction D1 and the advancing direction D2 of the crawler 11c, the traveling stability of the construction machine 10 may decrease at a location having a large angle between the gradient direction D1 and the advancing direction D2 of the crawler 11c. Further, in a case that the permissible range is set in consideration of only the degree of the gradient in such a manner as to ensure the stability of the construction machine 10 even in the lowest stable state thereof, the resultant permissible range is excessively narrow. This may lead to a wrong determination that even such a gradient as to enable the construction machine 10 to stably travel depending on an angle between the gradient direction D1 and the advancing direction D2 of the crawler 11c "deviates from the permissible range".

To avoid the wrong determination, Configuration 2 makes it possible to appropriately set the permissible range of the gradient depending on the advancing direction D2 of the crawler 11c of the construction machine 10 with respect to the gradient direction D1. As a result, it is possible to suppress a decrease in the traveling stability of the construction machine 10, and a wrong determination that even a gradient which enables the construction machine 10 to stably travel deviates from the permissible range.

Advantageous Effects of Third Invention

Configuration 3

The controller 40 determines an evaluation of a traveling route R based on predetermined evaluation criteria, and determines a traveling route R to be output by the output part 50 based on the determined evaluation. The evaluation criteria include a condition that the evaluation is higher as the degree of the gradient in the traveling route R is smaller.

Configuration 3 makes it possible to cause the output part 50 to output information about a traveling route R having a gentler gradient. The traveling route guidance device 20 can consequently perform a guide for enabling the construction machine 10 to reach the destination P2 in a more stable state.

Advantageous Effects of Fourth Invention

Configuration 4

The controller 40 determines an evaluation of a traveling route R based on predetermined evaluation criteria, and determines a traveling route R to be output by the output part 50 based on the determined evaluation. The evaluation criteria include a condition that the evaluation is higher as a less fuel is required to allow the construction machine 10 to reach the destination P2 from the current position P1.

Configuration 4 makes it possible to cause the output part 50 to output the information about the traveling route R for attainment of the reaching to the destination P2 with a less fuel. Accordingly, the traveling route guidance device 20 can perform a guide for enabling the construction machine 10 to reach the destination P2 with the less fuel.

Advantageous Effects of Fifth Invention
Configuration 5

For the case that a plurality of possible traveling routes R are derived as shown in FIG. 6, the traveling route guidance device 20 includes a selecting part 31 which permits a user to select a specific traveling route R from the plurality of possible traveling routes R.

Configuration 5 makes it possible to enhance the convenience for the user.

Advantageous Effects of Sixth Invention
Configuration 6

For the traveling of the construction machine 10, the construction machine 10 is externally operated, or automatically controlled.

In Configuration 6, the user of the traveling route guidance device 20 is presumed to be on the outside of the construction machine 10, not on the construction machine 10. In this configuration, the user refers to a person, e.g., an operator remotely operating the construction machine, who attempts to obtain the information about the traveling route R. The user on the outside may find it more difficult than one on the construction machine 10 to grasp the gradient of the landform around the construction machine 10. The user on the outside of the construction machine 10 may consequently find it difficult to grasp an appropriate traveling route R for the traveling, a need or no need of a land preparation, and a preparation-required location P7 in the case of the need of the land preparation. However, the traveling route guidance device 20 including Configurations 1-1 and 1-2 permits the user on the outside of the construction machine 10 to grasp a specific preparation-unrequired route R1 to be adopted for the traveling, or the preparation-required location P7 on the preparation-required route R2. That is to say, the advantageous effects brought about by Configurations 1-1 and 1-2 are particularly exerted in Configuration 6 as well.

Modifications

The above-described embodiment may be modified in various ways. For example, the configuration represented by the block diagram shown in FIG. 1 may be changed. Besides, the order of the steps in the flowchart shown in FIG. 2 may be changed. Moreover, a part of the structural components may be excluded. Furthermore, a part of the steps may not be executed.

For instance, in a case that a specific traveling route R is determined in Steps S33 and S43 based on the comprehensive evaluation value given to each of traveling routes R, the step of selecting a specific traveling route R from a plurality of traveling routes R (Steps S34 and S44 in FIG. 2) may be excluded. In this case, the selecting part 31 may not be provided.

For instance, a plurality of structural components may be adopted in combination. In other words, a single display device may include two or more structural components in combination among the destination acquiring part 23, the selecting part 31, and the output part 50 shown in FIG. 1.

The invention claimed is:

1. A traveling route guidance device comprising:
   a landform acquiring part including a distance sensor which acquires three-dimensional landform information about a landform around a construction machine;
   a current position acquiring part including a position sensor which acquires a current position of the construction machine with respect to the three-dimensional landform information;
   a destination acquiring part including at least one of a switch, a touch panel, and a keyboard which acquires a destination with respect to the three-dimensional landform information;
   a controller including a computer which derives at least one traveling route from the current position to the destination for the construction machine based on the three-dimensional landform information;
   an output part including at least one of a display and a speaker which outputs information about the at least one traveling route derived by the controller; and
   a non-volatile memory which stores permissible range information representing a permissible range of a gradient determined in terms of a stability of the construction machine, wherein
   when deriving a preparation-unrequired route which is a traveling route which enables the construction machine to travel thereon only when the gradient is less than an upper limit of the permissible range of the gradient until reaching the destination, the controller causes the output part to output information about the preparation-unrequired route,
   when deriving a preparation-required route, the controller determines a location which needs a preparation to enable the construction machine to travel only when the gradient is less than the upper limit of the permissible range of the gradient until reaching the destination, and causes the output part to output information about the location which needs the preparation and about the preparation-required route,
   when an angle between a direction in which a degree of the gradient reaches a maximum gradient of the landform and an advancing direction of a crawler of the construction machine is at a first value, the upper limit of the permissible range is smaller than when the angle is at a second value that is smaller than the first value, and
   the construction machine is controlled, via a construction machine controller, to travel along the preparation-unrequired route when the preparation-unrequired route is derived and to travel along the preparation-required route when the preparation-required route is derived.

2. The traveling route guidance device according to claim 1, wherein
   the controller determines an evaluation of the traveling route based on predetermined evaluation criteria, and determines a traveling route to be output by the output part based on the determined evaluation, and
   the evaluation criteria include a condition that a value of the evaluation is higher when a degree of the gradient in the traveling route is at a first value than when the degree of the gradient is at a second value which is larger than the first value of the degree of the gradient.

3. The traveling route guidance device according to claim 1, wherein
   the controller determines an evaluation of the traveling route based on predetermined evaluation criteria, and determines a traveling route to be output by the output part based on the determined evaluation, and
   the evaluation criteria include a condition that a value of the evaluation is higher when an amount of fuel required to allow the construction machine to reach the destination from the current position is at a first value than when the amount of the fuel is at a second value which is larger than the first value of the amount of fuel.

4. The traveling route guidance device according to claim 1, further comprising:
 a selecting part including at least one of the display and the speaker which permits a user to select a specific traveling route from a plurality of possible traveling routes,
 the plurality of possible traveling routes including the at least one traveling route to be derived by the controller.

5. The traveling route guidance device according to claim 1, wherein
 the construction machine is externally operated or automatically controlled.

6. The traveling route guidance device according to claim 1, wherein permissible range is stored in a permissible range table saved in the memory, the permissible range table being a two-dimensional table including a first axis representing the degree of the gradient and a second axis representing the angle.

\* \* \* \* \*